United States Patent
Ishihara

(10) Patent No.: US 8,919,153 B2
(45) Date of Patent: Dec. 30, 2014

(54) MANUFACTURING METHOD FOR GLASS BASE MATERIAL

(75) Inventor: Tomohiro Ishihara, Yokohama (JP)

(73) Assignee: Sumitomo Electric Industries, Ltd., Osaka-shi, Osaka (JP)

(*) Notice: Subject to any disclaimer, the term of this patent is extended or adjusted under 35 U.S.C. 154(b) by 244 days.

(21) Appl. No.: 13/574,879

(22) PCT Filed: Apr. 28, 2011

(86) PCT No.: PCT/JP2011/060362
§ 371 (c)(1),
(2), (4) Date: Jul. 24, 2012

(87) PCT Pub. No.: WO2011/136324
PCT Pub. Date: Nov. 3, 2011

(65) Prior Publication Data
US 2012/0291494 A1    Nov. 22, 2012

(30) Foreign Application Priority Data

Apr. 30, 2010 (JP) ................... 2010-105536
Apr. 30, 2010 (JP) ................... 2010-105540

(51) Int. Cl.
*C03B 37/018* (2006.01)
*C03B 37/014* (2006.01)

(52) U.S. Cl.
CPC ..... *C03B 37/01493* (2013.01); *C03B 37/01486* (2013.01); *C03B 37/01473* (2013.01); *C03B 37/01446* (2013.01); *C03B 37/01466* (2013.01)
USPC ............................................. 65/413; 65/421

(58) Field of Classification Search
USPC ................................... 65/413, 421
See application file for complete search history.

(56) References Cited

U.S. PATENT DOCUMENTS

| | | | |
|---|---|---|---|
| 4,453,961 A | 6/1984 | Berkey | |
| 4,810,276 A * | 3/1989 | Gilliland | 65/421 |
| 5,236,481 A * | 8/1993 | Berkey | 65/399 |
| 2004/0123630 A1* | 7/2004 | Sarkar | 65/421 |
| 2006/0115913 A1* | 6/2006 | Orita et al. | 438/22 |

FOREIGN PATENT DOCUMENTS

| | | | |
|---|---|---|---|
| CN | 1348431 A | 5/2002 | |
| EP | 0 367 871 A1 | 5/1990 | |
| EP | 0 556 580 A1 | 8/1993 | |
| JP | 63206324 A * | 8/1988 | ............. C03B 37/12 |
| JP | 2-137742 | 5/1990 | |
| JP | 2002-543026 | 12/2002 | |
| JP | 2005-170731 | 6/2005 | |
| JP | 2006-151747 | 6/2006 | |
| WO | 00/64825 | 11/2000 | |

OTHER PUBLICATIONS

English translation of PCT/ISA/237 dated Aug. 9, 2011 issued in the corresponding PCT Application No. PCT/JP2011/060362; 7 pages.

* cited by examiner

*Primary Examiner* — Queenie Dehghan
(74) *Attorney, Agent, or Firm* — Drinker Biddle & Reath LLP

(57) ABSTRACT

Provided is a method for manufacturing glass preforms with high yield. In the glass-preform manufacturing method according to the present invention, a glass preform is produced through a fixing step, a deposition step, an extraction step, a vitrification step, and a collapsing step in the enumerated order. At the deposition step, the mean density of the glass soot body deposited on the circumference of the tubular handle 12 is made higher than the mean density of the glass soot body deposited on the circumference of the starting mandrel 11. It is preferable that the longitudinal variation in the mean density of a glass soot body deposited from the start of deposition to the tenth layer of glass particles within the range of ±50 mm from the boundary position between the starting mandrel and the tubular handle be 0.01 g/cc/mm or less.

3 Claims, 4 Drawing Sheets

MANUFACTURING METHOD FOR GLASS BASE MATERIAL

TECHNICAL FIELD

The present invention relates to a method of manufacturing a glass preform for optical fibers.

BACKGROUND ART

An optical fiber is produced by drawing a glass preform having a substantially columnar form into a fiber by heating and softening an end thereof. The glass preform for optical fibers is manufactured by manufacturing methods, such as OVD method or MCVD method. Japanese translation of PCT international application No. 2002-543026 (Patent Literature 1) discloses a method for manufacturing a glass preform by OVD method.

The glass-preform manufacturing method disclosed in Patent Literature 1 is intended to produce glass preforms for optical fibers with low water content. According to this manufacturing method, a glass soot body is produced by depositing glass particles on the circumferences of a starting mandrel and a tubular handle in which the starting mandrel is inserted, and then a glass soot body having a central hole along the axial direction is produced by pulling out the starting mandrel from the glass soot body. Subsequently, the glass soot body is heated to be dry and consolidated, and then the central hole thereof is collapsed. Thus, a transparent glass preform is produced.

SUMMARY OF INVENTION

Technical Problem

According to the glass-preform manufacturing method disclosed in Patent Literature 1, during a deposition step for making a glass soot body by depositing glass particles on the circumference of a starting member, the starting member and a glass synthesizing burner are subjected to relative two-way motions along the axial direction of the starting mandrel such that glass particles are deposited on the circumference of the starting member in a range extending from the tip portion of the starting mandrel to a part of the tubular handle, and thereby the glass soot body is produced. When a glass soot body is produced by such deposition step, there are cases where the glass soot body breaks, resulting in less yield of glass-preform manufacture.

The object of the present invention is to provide a method for manufacturing glass preforms with high yield.

Solution to Problem

According to the present invention, the method of manufacturing a glass preform comprises: (1) a fixing step for preparing a starting member by inserting a starting mandrel into a tubular handle and fixing such that the tip portion of the starting mandrel protrudes from an end of the tubular handle; (2) a deposition step for producing a glass soot body by depositing glass particles on the circumference of the starting member by subjecting the starting member and a glass synthesizing burner to relative two-way motions along the starting mandrel in a range extending from the tip portion of the starting mandrel to a part of the tubular handle; (3) an extraction step for pulling out the starting mandrel from the tubular handle and the glass soot body; (4) a vitrification step for producing a consolidated glass pipe by heating the glass soot body after the extraction step; and (5) a collapsing step for making a solid glass preform by reducing a pressure inside of the consolidated glass pipe and heating the consolidated glass pipe. In the deposition step, the mean density of a glass soot body deposited on the circumference of the tubular handle is made larger than the mean density of a glass soot body deposited on the circumference of the starting mandrel.

At the deposition step in the glass-preform manufacturing method relating to the present invention, it is preferable that the longitudinal variation in the mean density of a glass soot body deposited from the start of deposition to the tenth layer of glass particles within the range of ±50 mm from the boundary position between the starting mandrel and the tubular handle be 0.01 g/cc/mm or less. With respect to the deposition that is performed from the start of the deposition to the tenth layer of glass particles, preferably the mean density of a glass soot body deposited on the circumference of the starting mandrel is 0.1 g/cc or more and 0.3 g/cc or less, while the mean density of a glass soot body deposited on the circumference of the tubular handle is 0.4 g/cc or more. And, more preferably, the mean density of a glass soot body deposited on the circumference of the starting mandrel is 0.2 g/cc or more and less than 0.4 g/cc, while the mean density of the glass soot body deposited on the circumference of the tubular handle is 0.4 g/cc or more.

It should be noted that the above-mentioned mean density of a glass soot body is the value that is obtained by dividing the weight of each part by the volume of such part in the glass soot body finally formed at the deposition step. Also, the mean density of the glass soot body formed up to the tenth layer is a value obtained by dividing the weight of each part by the volume of such part in such a state as formed from the start of deposition to the tenth layer.

Advantageous Effects of the Invention

The glass-preform manufacturing method relating to the present invention enables manufacturing glass preforms with high yield.

DESCRIPTION OF EMBODIMENTS

Figure 1:
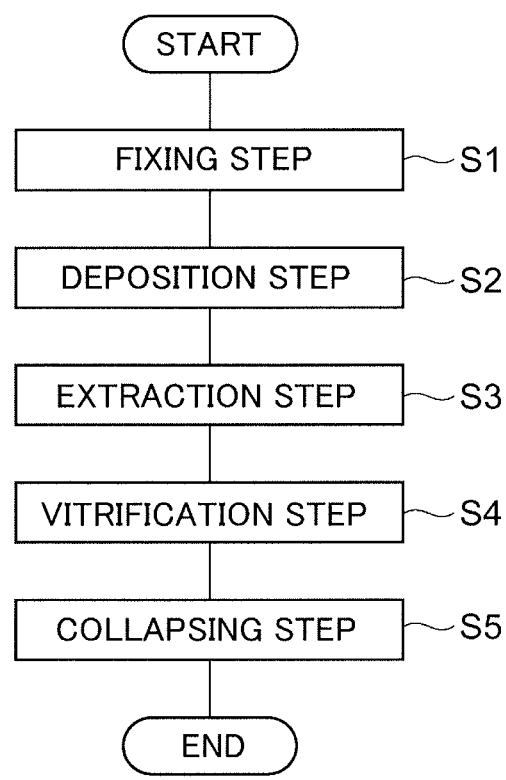
FIG. 1 is a flow chart of the glass-preform manufacturing method relating to an embodiment of the present invention.

Hereinafter, preferred embodiments of the present invention will be described in reference to the accompanying drawings. The drawings are provided for the purpose of explaining the embodiments and are not intended to limit the scope of the invention. In the drawings, an identical mark represents the same element so that the repetition of explanation may be omitted. The dimensional ratios in the drawings are not always exact.

FIG. 1 is a flow chart of the glass-preform manufacturing method relating to the embodiment of the present invention. With the glass-preform manufacturing method of FIG. 1, glass preforms are produced through the fixing step S1, the deposition step S2, the extraction step S3, the vitrification step S4, and the collapsing step S5 in the named order. The glass preform to be manufactured with this glass-preform manufacturing method may be an optical fiber preform that will be drawn into an optical fiber as it is, or may be a core preform that will be processed into the core part of an optical fiber, for example.

Figure 2:
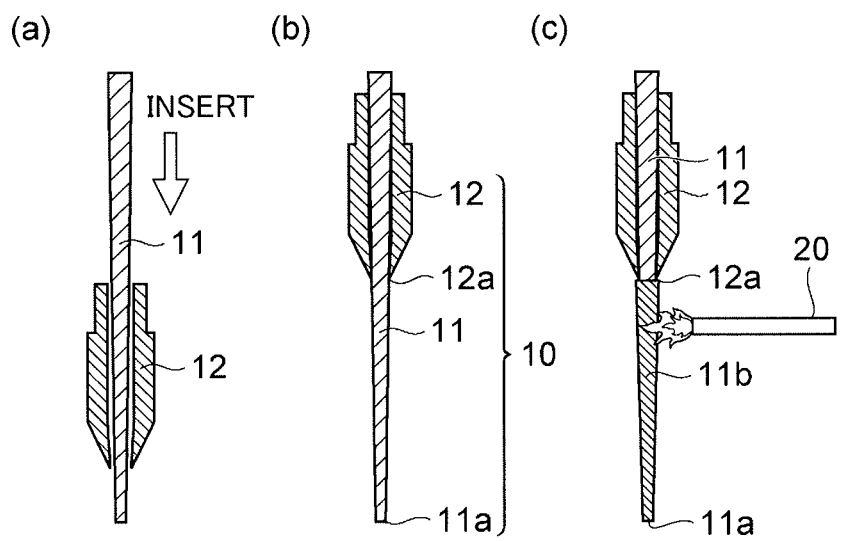
FIG. 2 is a conceptional schematic diagram illustrating the fixing step S1 of the glass-preform manufacturing method of FIG. 1.

FIG. 2 is a conceptional schematic diagram illustrating the fixing step S1 of the glass-preform manufacturing method of FIG. 1. At the fixing step S1, the starting mandrel 11 is inserted into the tubular handle 12 and fixed thereto such that the tip portion 11a of the starting mandrel 11 protrudes from the end 12a of the tubular handle 12, and thereby the starting member 10 is prepared (FIG. 2(a), FIG. 2(b)). The starting mandrel 11 is made of alumina, glass, fireproof ceramics, or carbon, for example. The tubular handle 12 is made of silica glass.

It is preferable that a carbon membrane 11b be formed, by flames from a burner 20 such as a city gas burner, an acetylene burner, or the like, on the circumference of the portion of the starting mandrel 11 that protrudes from an end 12a of the tubular handle 12 in the starting member 10 (FIG. 2(c)). During such formation of carbon membrane, the starting member 10 is rotated using the central axis of the starting mandrel 11 as its center, and the burner 20 repeats relative two-way motion with respect to the starting member 10 and along the axial direction of the starting mandrel 11.

Figure 3:
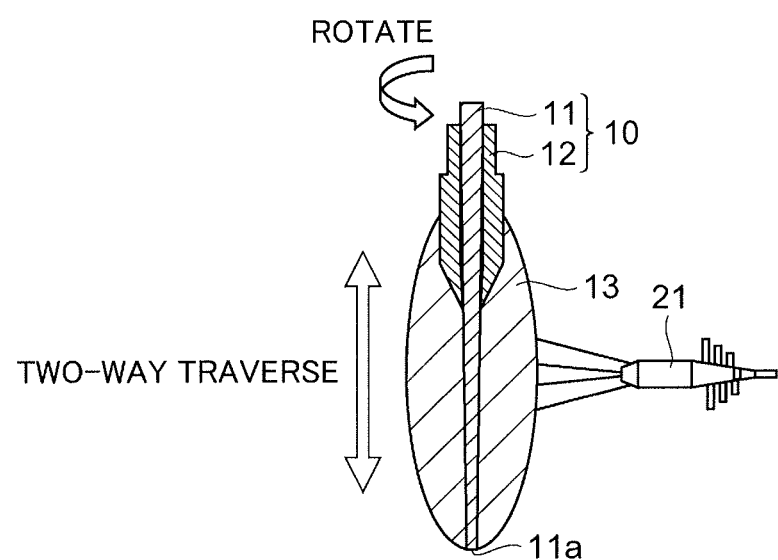
FIG. 3 is a conceptional schematic diagram illustrating the deposition step S2 of the glass-preform manufacturing method of FIG. 1.

FIG. 3 is a conceptional schematic diagram illustrating the deposition step S2 of the glass-preform manufacturing method of FIG. 1. At the deposition step S2, the starting member 10 rotates using the central axis of the starting mandrel 11 as its center. A glass synthesizing burner 21 arranged on the side of the starting member 10 and forming oxy-hydrogen flames repeats relative two-way motion with respect to the starting member 10 and along the axial direction of the starting mandrel 11. Thus, glass particles are deposited by the OVD method on the circumference of the starting member 10 in a range extending from the tip portion 11a of the starting mandrel 11 to a part of the tubular handle 12. In this manner, a glass soot body 13 is produced.

At the deposition step S2, the flow of materials supplied to the glass synthesizing burner 21 is adjusted at every traverse (from the tip portion 11a of the starting mandrel 11 to a part of the tubular handle 12, or from a part of the tubular handle 12 to the tip portion 11a of the starting mandrel 11). Thus, the glass soot body formed on the circumference of the starting mandrel 11 will have a predetermined radial distribution of composition (namely, the radial refractive-index profile in a glass preform or an optical fiber which will be produced from the glass preform later).

Figure 4:
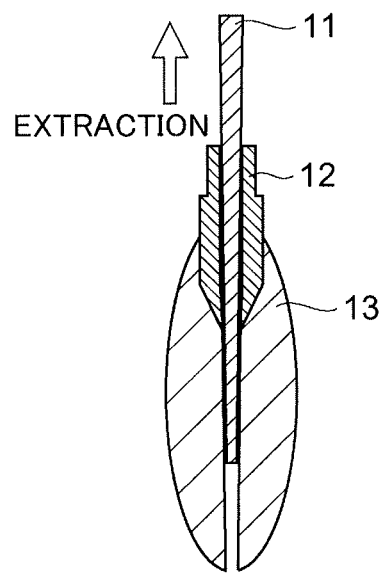
FIG. 4 is a conceptional schematic diagram illustrating the extraction step S3 of the glass-preform manufacturing method of FIG. 1.

FIG. 4 is a conceptional schematic diagram illustrating the extraction step S3 of the glass-preform manufacturing method of FIG. 1. At the extraction step S3, the starting mandrel 11 is pulled out from the tubular handle 12 and the glass soot body 13. At this time, the tubular handle 12 and the glass soot body 13 remain as mutually fixed. Note that if a carbon membrane is formed beforehand on the circumference of the portion of the starting mandrel 11 protruding from the end 12a of the tubular handle 12 at the fixing step S1, the inner wall surface of the central hole in the glass soot body 13a will be prevented from being damaged when the starting mandrel 11 is pulled out at the extraction step S3.

Figure 5:
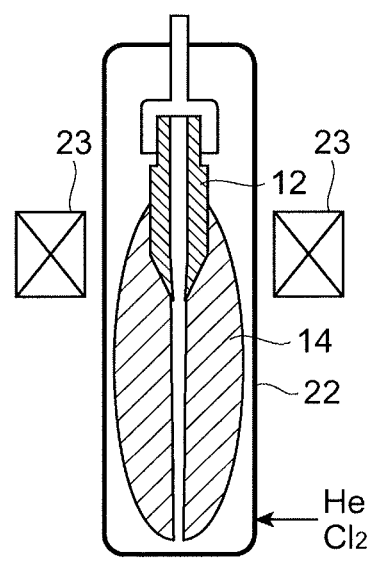
FIG. 5 is a conceptional schematic diagram illustrating the vitrification step S4 of the glass-preform manufacturing method of FIG. 1.

FIG. 5 is a conceptional schematic diagram illustrating the vitrification step S4 of the glass-preform manufacturing method of FIG. 1. At the vitrification step S4, the glass soot body 13 is put, integrally with the tubular handle 12, in the heating furnace 22 into which helium gas and $Cl_2$ gas are fed, and the glass soot body 13 is heated with a heater 23. Thus, a consolidated glass pipe 14 is produced.

Figure 6:
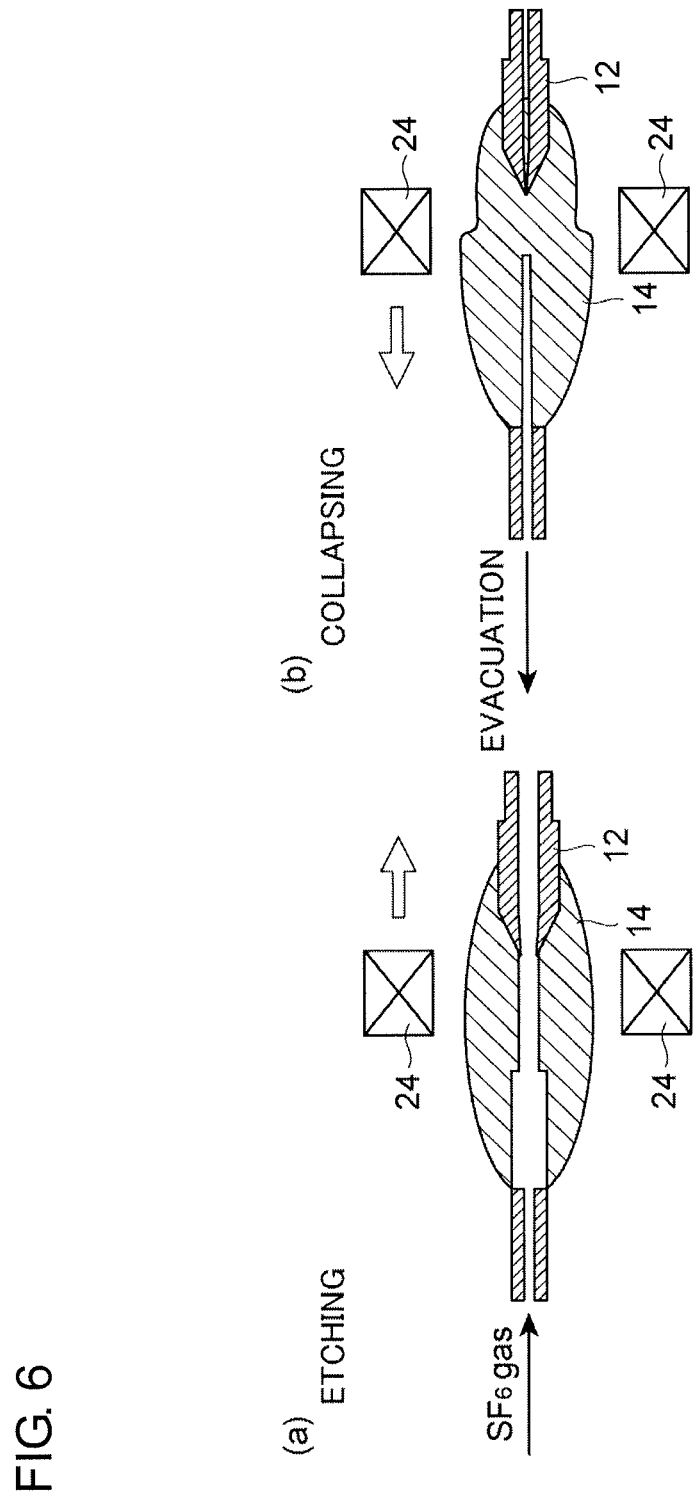
FIG. 6 is a conceptional schematic diagram illustrating the collapsing step S5 of the glass-preform manufacturing method of FIG. 1.

FIG. 6 is a conceptional schematic diagram illustrating the collapsing step S5 of the glass-preform manufacturing method of FIG. 1. At the collapsing step S5, the consolidated glass pipe 14 is put in a heating furnace and rotated, while it is heated with the heater 24 and $SF_6$ is introduced into its central hole, so that vapor-phase etching is carried out on the inner wall surface of the central hole (FIG. 6 (a)). Subsequently, the consolidated glass pipe 14 is heated with the heater 24 while the pressure inside of the glass pipe is reduced, so that it is collapsed (FIG. 6 (b)). Thus, a solid glass preform is produced.

The transparent glass preform thus prepared is subjected to further processing, such as formation of a cladding layer thereon, vitrification processing, etc., resulting in an optical fiber preform. Furthermore, a tip of the optical fiber preform is drawn by heat-softening, so that an optical fiber is produced.

In the present invention, the mean density of the glass soot body around the tubular handle 12 is made higher (harder) than the mean density of the glass soot body around the starting mandrel 11 at the deposition step S2. This enables lessening the occurrence of cracks of the glass soot body, since the glass particles deposited on the circumference of the tubular handle 12 can sufficiently support the glass particles deposited on the circumference of the starting mandrel 11.

If there is a steep variation in the density of glass particles near the boundary between the starting mandrel 11 and the tubular handle 12, differences will occur in expansion of glass particles when the temperature near the boundary falls (namely, when the boundary is distanced from a flame), which will tend to cause exfoliation (cracks) of glass particles near the boundary. Therefore, such exfoliation (cracks) of glass particles as mentioned above can be prevented by controlling deposition from the beginning to the tenth layer of glass particles so that the variation of the mean density of the glass soot body in the longitudinal direction within the ±50 mm range (50 mm range on both sides) from the boundary position between the starting mandrel 11 and the tubular handle 12 may be as less steep as 0.01 g/cc/mm or less. Since the deposition thickness is about 0.03 to 0.6 mm per layer depending on traverse speed, ten layers are equivalent to a thickness of about 0.3 to 6 mm. The deposition of glass particles is usually conducted for about 100 to 2000 layers as a whole.

At the deposition step S2, with respect to the deposition of glass particles from the beginning to the tenth layer, preferably the mean density of the glass soot body around the starting mandrel 11 is 0.1 g/cc or more and 0.3 g/cc or less, and the mean density of the glass soot body around the tubular handle 12 is 0.4 g/cc or more.

By controlling the mean density of the glass soot body around the starting mandrel 11 to be as low as 0.1 to 0.3 g/cc, the inner surface of the central hole in the glass soot body existing upon the extraction of the starting mandrel 11 accomplished at the extraction step S3 becomes smooth, and consequently, the inner surface of the central hole of the consolidated glass pipe after the vitrification step S4 is also smoothed. Note that if it is less than 0.1 g/cc, the strength of the glass soot body cannot be sufficiently maintained. By controlling the mean density of the glass soot body around the tubular handle 12 to be 0.4 g/cc or more, the strength and adherence between the surrounding glass soot body and the tubular handle 12 for supporting the whole weight of glass particles increase such that the glass particles deposited on the circumference of the starting mandrel 11 can sufficiently be supported, and accordingly occurrence of cracks can be prevented.

Also, if the mean density of the glass soot body around the tubular handle 12 is 0.4 g/cc or more, the adhesion with the tubular handle 12 can be sufficiently obtained, which will enable supporting the glass particles deposited on the circumference of the starting mandrel 11. On the other hand, by decreasing the density of the glass particles around the starting mandrel 11, the inner surface of the central hole of the glass soot body existing after the starting mandrel 11 has been extracted at the extraction step S3 can be made smooth. Therefore, the occurrence of damage in the inner surface of the central hole will become less, and accordingly the possibility of the consolidated glass pipe being broken after the vitrification of the glass soot body or during collapsing of the consolidated glass pipe can be made lower. To achieve such effect, it is sufficient if the density of glass particles deposited around the starting mandrel 11 is less than 0.4 g/cc. However, if the mean density of the glass soot body around the starting mandrel 11 is less than 0.2 g/cc, it will become impossible to fully maintain the strength of the glass soot body. Therefore, the mean density is preferably 0.2 g/cc or more and less than 0.4 g/cc.

EXAMPLE

In Examples 1 to 13, glass preforms from which graded-index optical fibers are produced by drawing are prepared. At the deposition step S2, OVD equipment is used, and the starting mandrel 11 is made of aluminum having an outer diameter of 9 to 10 mm and a length of 1200 mm. The tubular handle 12 is made of silica glass having a length of 600 mm, an outer diameter of 20 to 40 mm and an inner diameter of 9.8 to 21 mm. At an end 12a of the tubular handle 12, there is a level difference of 0.5 mm.

The glass-material gas supplied to the glass synthesizing burner 21 for forming an oxy-hydrogen flame is $SiCl_4$ (flow rate: 1 to 3 SLM/piece) and $GeCl_4$ (flow rate: 0.0 to 0.3 SLM). Velocity of the relative motion of the starting member 10 with respect to the glass synthesizing burner 21 is 3 to 1500 mm/minute. Note that adjustment for heightening the density of glass particles is possible by increasing the flow rate of hydrogen gas, lowering the flow rate of material gas, or decreasing the velocity of the relative motion of the glass synthesizing burner 21 with respect to the starting member 10, or the like. For lowering the density, the adjustment can be done by performing the operation that is opposite to the above-mentioned adjustment.

The collapsing step S5 is performed after the deposition step S2, the extraction step S3, and the vitrification step S4. At the collapsing step S5, the consolidated glass pipe 14 is put in a heating furnace and rotated at 30 rpm, while heated to a temperature in a range of 1900° C. to 2200° C. with a heating furnace (heater), which moves at a speed of 5 to 20 mm/minute in the longitudinal direction of the consolidated glass pipe 14. For the purpose of heating means at the collapsing step S5, an oxy-hydrogen burner or a heat source such as a carbon heater or a heating element using an electromagnetic induction coil may be used. In such case, $SF_6$ gas is supplied at a rate of 50 to 100 sccm so as to flow inside the central hole of the consolidated glass pipe 14 so that vapor-phase etching of the inner wall surface of the central hole in the consolidated glass pipe 14 is carried out. Subsequently, the pressure inside of the central hole is reduced to 0.1 to 10 kPa, and the consolidated glass pipe 14 is collapsed at the same temperature as that of etching, and thereby a glass preform is produced.

The glass preform prepared in this way is elongated to have a desired diameter, and a jacket glass is provided around the outer circumference by the OVD method, whereby a glass preform for making an optical fiber is produced. Such glass preform for an optical fiber is drawn, whereby a graded-index multi-mode fiber is manufactured.

Table 1 shows the following in each of Examples 1 to 13 and Comparative Examples: mean density X (g/cc) of glass soot body around the starting mandrel 11; mean density Y (g/cc) of glass soot body around the tubular handle 12; mean density X' (g/cc) of glass soot body deposited from the deposition start to the tenth layer of glass particles around the starting mandrel 11; mean density Y' (g/cc) of glass soot body deposited from the deposition start to the tenth layer of glass particles around the tubular handle 12; longitudinal variation Z (g/cc/mm) of the mean density of the glass soot body deposited from the deposition start to the tenth layer of glass particles within the range of ±50 mm from the boundary position between the starting mandrel 11 and the tubular handle 12; and Yield ratio η (%) that is a probability of acceptable manufacture in which no cracks will occur in a glass soot body or a consolidated glass pipe. The sign "A" regarding a defect factor expresses an occurrence of crack in a consolidated glass pipe (that is, the mean density X of a glass soot body around the starting mandrel 11 was so high that a crack occurred in the hole inner surface and consequently the consolidated glass pipe cracked after the vitrification although it did not crack in the state of the glass soot body), and the sign "B" expresses that a glass soot body cracked.

TABLE I

| | X g/cm³ | Y g/cm³ | X' g/cm³ | Y' g/cm³ | Z g/cm³/mm | η % | Defect factor |
|---|---|---|---|---|---|---|---|
| Example 1 | 0.25 | 0.50 | 0.10 | 0.60 | 0.0063 | 100 | |
| Example 2 | 0.30 | 0.50 | 0.20 | 0.60 | 0.0050 | 100 | |
| Example 3 | 0.39 | 0.50 | 0.30 | 0.60 | 0.0038 | 100 | |
| Example 4 | 0.40 | 0.50 | 0.31 | 0.60 | 0.0036 | 98 | A |
| Example 5 | 0.44 | 0.50 | 0.40 | 0.60 | 0.0025 | 95 | A |
| Example 6 | 0.19 | 0.39 | 0.09 | 0.39 | 0.0120 | 70 | B |
| Example 7 | 0.27 | 0.40 | 0.15 | 0.50 | 0.0044 | 100 | |
| Example 8 | 0.27 | 0.60 | 0.15 | 0.70 | 0.0069 | 100 | |
| Example 9 | 0.27 | 0.80 | 0.15 | 0.90 | 0.0094 | 100 | |
| Example 10 | 0.27 | 0.90 | 0.15 | 1.00 | 0.0106 | 85 | B |
| Example 11 | 0.19 | 1.00 | 0.15 | 1.10 | 0.0119 | 75 | B |
| Example 12 | 0.27 | 0.35 | 0.15 | 0.38 | 0.0029 | 90 | B |
| Example 13 | 0.27 | 0.30 | 0.15 | 0.30 | 0.0019 | 80 | B |
| Comparative example 1 | 0.39 | 0.39 | 0.25 | 0.50 | 0.0031 | 50 | B |
| Comparative example 2 | 0.39 | 0.30 | 0.25 | 0.40 | 0.0019 | 40 | B |
| Comparative example 3 | 0.39 | 0.20 | 0.25 | 0.10 | 0.0019 | 30 | B |

When the mean density Y of a glass soot body around the tubular handle 12 is larger than the mean density X of a glass soot body around the starting mandrel 11, the yield ratio of acceptable manufacture is not less than 70%, and glass preforms can be manufactured with high yield. If the mean density X of a glass soot body around the starting mandrel 11 is 0.2 g/cc or more and less than 0.4 g/cc while the mean density Y of a glass soot body around the tubular handle 12 is 0.4 g/cc or more, the yield ratio of acceptable manufacture is not less than 85%, glass preforms can be manufactured with higher yield. Also, glass preforms can be manufactured with high yield if the mean density X of a glass soot body that is deposited from the deposition start to the tenth layer of glass particles around the starting mandrel 11 is 0.1 g/cc or more and 0.3 g/cc or less while the mean density Y of a glass soot body that is deposited from the deposition start to the tenth layer of glass particles around the tubular handle 12 is 0.4 g/cc or more, the yield ratio of acceptable manufacture is not less than 75%. Moreover, if the longitudinal variation Z of the mean density of a glass soot body deposited from the deposition start to the tenth layer of glass particles within the range of ±50 mm from the boundary position between the starting mandrel 11 and the tubular handle 12 is 0.01 g/cc/mm or less, the yield ratio of acceptable manufacture is not less than 80%, and thus glass preforms can be manufactured with such high yield.

INDUSTRIAL APPLICABILITY

The present invention is useful as a method of manufacturing glass preforms for optical fibers.

CITATION LIST

Patent Literature

Patent Literature 1: Japanese translation of PCT international application No. 2002-543026

The invention claimed is:

1. A method of manufacturing a glass preform, comprising:
a fixing step for preparing a starting member by inserting a starting mandrel into a tubular handle and fixing such that the tip portion of the starting mandrel protrudes from an end of the tubular handle;
a deposition step for producing a glass soot body by depositing glass particles on the circumference of the starting member by subjecting the starting member and a glass synthesizing burner to relative two-way motions along the starting mandrel in a range extending from the tip portion of the starting mandrel to a part of the tubular handle;
an extraction step for pulling out the starting mandrel from the tubular handle and the glass soot body;
a vitrification step for producing a consolidated glass pipe by heating the glass soot body after the extraction step; and
a collapsing step for making a solid glass preform by reducing a pressure inside of the consolidated glass pipe and heating the consolidated glass pipe, wherein
the mean density of a glass soot body deposited on the circumference of the tubular handle is made larger than the mean density of a glass soot body deposited on the circumference of the starting mandrel, and
the longitudinal variation in the mean density of a glass soot body deposited from the start of deposition to the tenth layer of glass particles within the range of ±50 mm from the end of the tubular handle is 0.01 g/cc/mm or less.

2. A method of manufacturing a glass preform as set forth in claim 1, wherein
the mean density of a glass soot body deposited on the circumference of the starting mandrel is 0.1 g/cc or more and 0.3 g/cc or less, while the mean density of a glass soot body deposited on the circumference of the tubular handle is 0.4 g/cc or more, with respect to the deposition that is performed from the start of the deposition to the tenth layer of glass particles.

3. A method of manufacturing a glass preform as set forth in claim 1, wherein
the mean density of a glass soot body deposited on the circumference of the starting mandrel is 0.2 g/cc or more and less than 0.4 g/cc, while the mean density of the glass soot body deposited on the circumference of the tubular handle is 0.4 g/cc or more.

* * * * *